Figure 1:
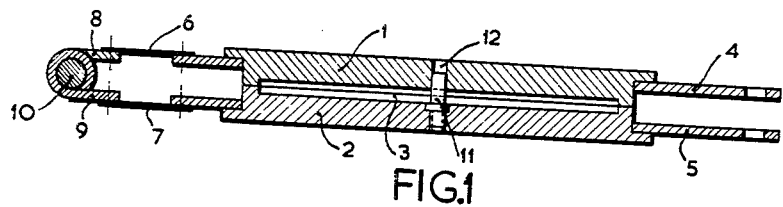

May 23, 1961     P. R. DIJKSTERHUIS ET AL     2,984,867

MOULD

Filed March 11, 1958

INVENTORS
POPKO REINDER DIJKSTERHUIS
JAN CHRISTOFFEL VAN HOUTEN

BY

AGENT

United States Patent Office 2,984,867
Patented May 23, 1961

2,984,867
MOULD

Popko Reinder Dijksterhuis and Jan Christoffel van Houten, both of Baarn, Netherlands, assignors to North American Philips Company, Inc., New York, N.Y., a corporation of Delaware Filed Mar. 11, 1958, Ser. No. 720,687

Claims priority, application Netherlands Mar. 14, 1957

3 Claims. (Cl. 18—5.3)

There are known moulds particularly suitable for moulding flat objects of very small thickness relative to their surface dimensions, which are provided with depressions and holes or cavities, particularly gramophone records; this mould comprises an upper stamper and a lower stamper, which are hinged to one another. The upper stamper and the lower stamper may be constituted by moulding blocks provided with heating and cooling elements; the stampers may not be provided with such elements and are then introduced as a whole between heated or cooled pressing blocks. The stampers or blocks may be pivotably connected with one another. There is, of course, always a certain amount of play in such pivots and since the upper and lower stampers must be accurately fixed in position relatively to one another, they must be provided with fitting studs and similar parts. Use may also be made of fitting edges for this purpose. If the mould serves to manufacture gramophone records, which are always provided with a center-hole, the central stud, which determines the hole in the record for the pin of the turntable, may serve as a fitting stud. If the objects to be moulded have depressions and holes or cavities, so that the upper and lower stampers must have pins and elevations and corresponding apertures and depressions respectively, the closing and particularly the opening of the mould may give rise to difficulties, since at the beginning of the opening and at the end of the closure the upper and lower stampers must move parallel to one another in a direction at right angles to their surfaces. This may be achieved in known manner by constructing the pivot in a manner such that the hinge pin is rigid in one blade, whereas it is adapted to perform a movement in the desired direction in the other blade; thus, however, play is again introduced into the pivot.

In order to obviate these disadvantages and to permit the stampers to perform the desired relative movements, the upper stamper and the lower stamper have, in accordance with the invention, a joint which provides two possibilities of movement for the stampers relative to one another.

According to one aspect of the invention resilient material is provided between the upper and lower stampers and the pivot blades proper. The pivot blades may be made of this resilient material, but, in accordance with a further aspect of the invention, it is to be preferred to manufacture the pivot blades themselves of non-resilient material and to provide a resilient joint, preferably constituted by a blade spring, between each stamper and the associated pivot blade. In this case conventional, commercially obtainable hinges can be employed.

The invention will now be described more fully with reference to the drawing, which shows one embodiment of the invention and in which Fig. 1 is a plan view of a mould constructed in the form of a so-called "book."

Figure 2:
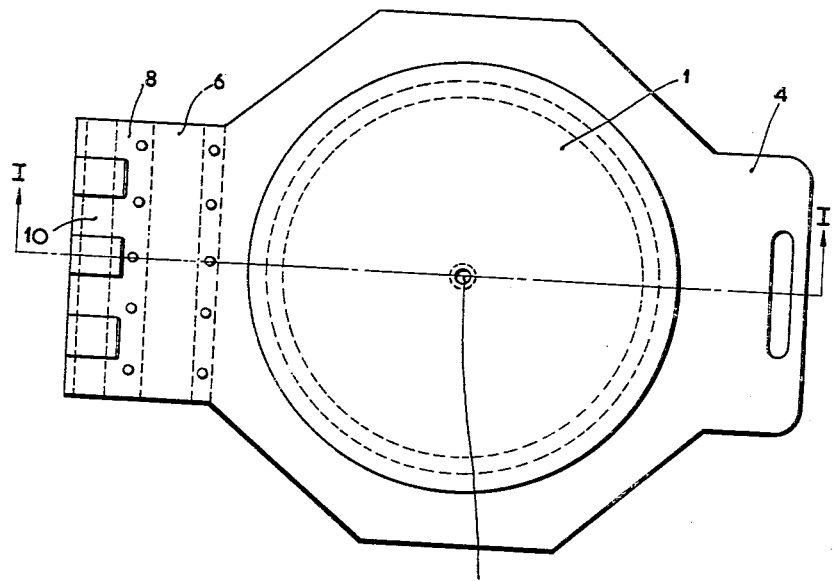
Figure 3:
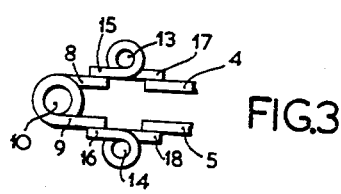

Fig. 2 is a sectional view of the mould shown in Fig. 1, taken on the line I—I, viewed in the direction of the arrow and Fig. 3 shows diagrammatically a joint formed by double hinges.

Referring to the figures, reference numerals 1 and 2 designate an upper templet and a lower templet, which, one superimposed upon the other, form the boundaries of a mould 3. The space 3, which may, for example, be the mould of a gramophone record, is closed on all sides, when the templets 1 and 2 are joined one on the other. They are mounted in plates 4 and 5, which are connected by means of blade springs 6 and 7 to the pivotal blades 8 and 9 of the pivot 10. The lower templet 2 is provided with a stud 11; this stud serves to form the central aperture in the gramophone record. At the same time the stud 11 determines the correct position of the upper templet 1 relative to the lower templet 2, to which end the upper templet is provided with an aperture 12, in which fits the stud 11 when the mould is closed. The opening and closing of the mould could give rise to difficulties, if owing to the springs 6 and 7 a movement of the templet 1 with the plate 4 in a direction at right angles to the templet 2 with the plate 5 were not possible, the templet 1 remaining parallel to the templet 2.

The springs 6 and 7 are not loaded, both in the case of a closed and of an open mould. Consequently, the mould can never open or close owing to spring effect. Only immediately before closing or after opening the springs are loaded in order to permit the desired opening or closing operations.

As an alternative, the pivotal blades 8 and 9 may be rendered resilient and secured directly to the plates 4 and 5. However, this involves a more costly construction, since conventional pivots cannot be used in this case. The plates 4 and 5 may also be connected with one another by means of a plurality of pivots, which is shown in Fig. 3, so that the pivotal blade 8 is connected with a pivotal blade 15 of a second pivot 13, of which the second pivotal blade 17 is secured to the plate 4. In the same manner the pivotal blade 9 is connected with the plate 15 with the interposition of a pivot 14, having blades 16 and 18. Then the complete mould may have a more compact structure in the direction of length than with the use of springs, but the construction is heavier and is more vulnerable in operation owing to any deposition of soil in the pivots.

What is claimed is:

1. A mold particularly suitable for molding planar objects having a thickness which is relatively small with respect to surface dimensions, and the surface of which, at least in part, is provided with depressions and apertures, said mold comprising an upper stamping element, a lower stamping element, pivot means for rotating said stamping elements relative to one another, and resilient means connecting said stamping elements to said pivot means for moving said stamping elements laterally relative to one another in at least two directions.

2. A mold as claimed in claim 1 in which the stamping elements are connected to the pivot means by resilient blades.

3. A mold as claimed in claim 2 in which the pivot means includes two blades of non-resilient material connected to the resilient blades.

References Cited in the file of this patent

UNITED STATES PATENTS

| | | |
|---|---|---|
| 2,340,161 | Van Deventer | Jan. 25, 1944 |
| 2,605,506 | Miller | Aug. 5, 1952 |